United States Patent [19]

Kukimoto et al.

[11] Patent Number: 5,131,444

[45] Date of Patent: Jul. 21, 1992

[54] HEAVY DUTY PNEUMATIC TIRES INCLUDING STEPPED TREAD ZONES FOR PREVENTING UNEVEN WEARING

[75] Inventors: Takashi Kukimoto; Yasutoshi Aoki; Naoto Yamagishi, all of Kodaira; Shinji Usui, Tokyo, all of Japan

[73] Assignee: Bridgestone Corporation, Tokyo, Japan

[21] Appl. No.: 257,896

[22] Filed: Oct. 14, 1988

[30] Foreign Application Priority Data

Oct. 20, 1987 [JP] Japan ............................... 62-266011
Oct. 22, 1987 [JP] Japan ............................... 62-265248

[51] Int. Cl.⁵ .................................................. B60C 11/06
[52] U.S. Cl. ............................. 152/209 R; 152/DIG. 3
[58] Field of Search .......... 152/209 R, 209 D, 209 A, 152/DIG. 3, 523

[56] References Cited

U.S. PATENT DOCUMENTS

| | | | |
|---|---|---|---|
| 2,197,662 | 4/1940 | Hughes | 152/209 R |
| 2,265,543 | 12/1941 | Overman | 152/209 R |
| 2,760,541 | 8/1956 | Reifenberger | 152/523 |
| 3,550,665 | 12/1970 | Verdier | 152/209 R |
| 3,782,438 | 1/1974 | Mirtain | 152/209 R |
| 4,200,134 | 4/1980 | Takigawa et al. | 152/209 R |
| 4,262,721 | 4/1981 | Tadokoro et al. | 152/209 R |
| 4,262,722 | 4/1981 | Takigawa et al. | 152/209 R |
| 4,353,402 | 10/1982 | Burche et al. | 152/209 R |
| 4,480,671 | 11/1984 | Giron | 152/209 R |
| 4,936,363 | 6/1990 | Schuster et al. | 152/209 R |

FOREIGN PATENT DOCUMENTS

| | | |
|---|---|---|
| 1610070 | 12/1971 | Australia . |
| 3671671 | 6/1973 | Australia . |
| 64507 | 11/1980 | Australia . |
| 0123135 | 10/1984 | European Pat. Off. . |
| 2816626 | 10/1978 | Fed. Rep. of Germany . |
| 858220 | 11/1940 | France . |
| 1202712 | 1/1960 | France . |
| 2317112 | 7/1975 | France . |
| 2444576 | 12/1979 | France . |
| 903389 | 8/1962 | United Kingdom ............ 152/209 R |
| 2018208 | 10/1979 | United Kingdom . |

Primary Examiner—Geoffrey L. Knable
Attorney, Agent, or Firm—Sughrue, Mion, Zinn Macpeak & Seas

[57] ABSTRACT

An uneven wear-resisting heavy duty pneumatic tire comprises main grooves continuously extending in a tread of the tire along a circumference thereof, land portions separated by the main grooves, and stepped zones each provided in the land. Each stepped zone has a surface located radially inside of the tread by a step a viewed sectionally. Each of said stepped zones is separated from the adjacent land portions via a pair of circumferentially extending grooves or narrow cuts. An uneven wearing-sacrificing portion is formed by the surface of the stepped zone. The uneven wear-sacrificed portion slide-contacts with the tread within the tread ground-contacting area for supporting the load exerted upon the tire.

19 Claims, 22 Drawing Sheets

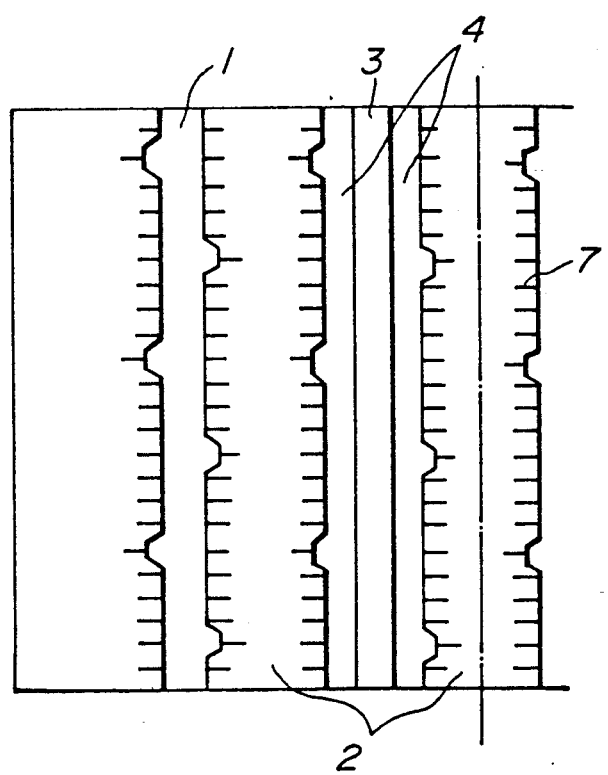
FIG_2

FIG_3a
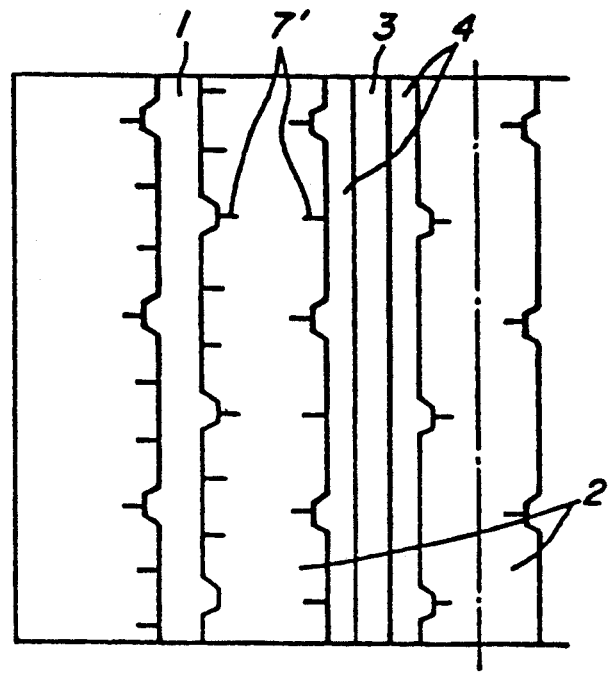
FIG_3b
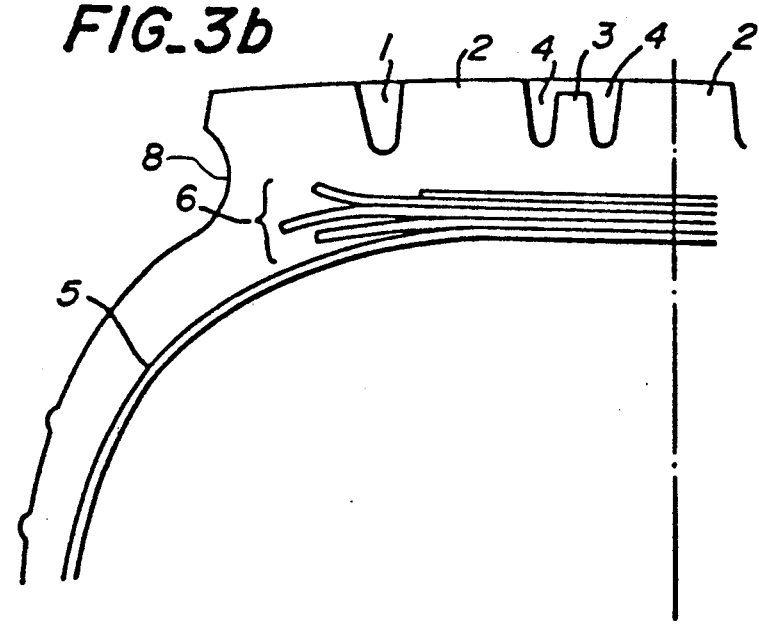

FIG._4a
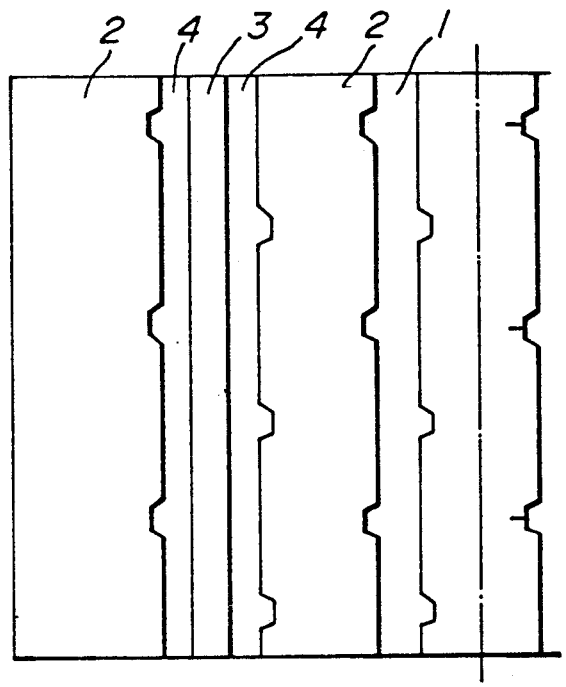
FIG._4b
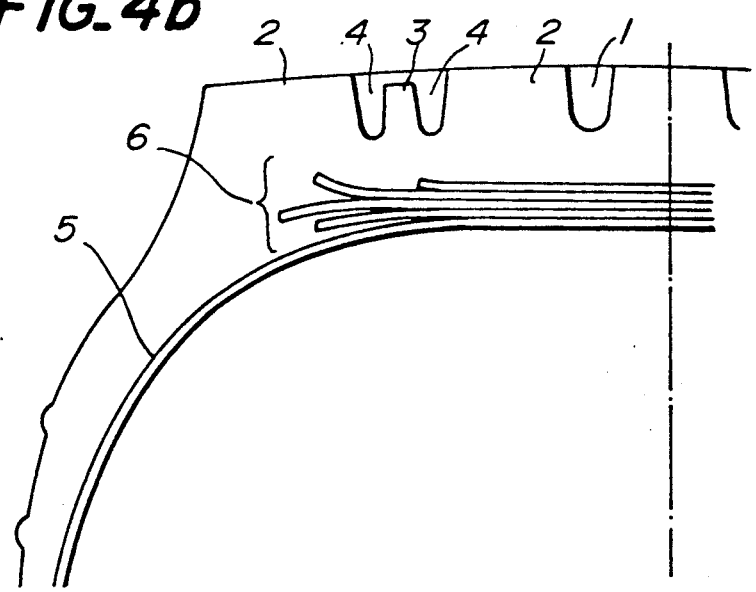

FIG_6a
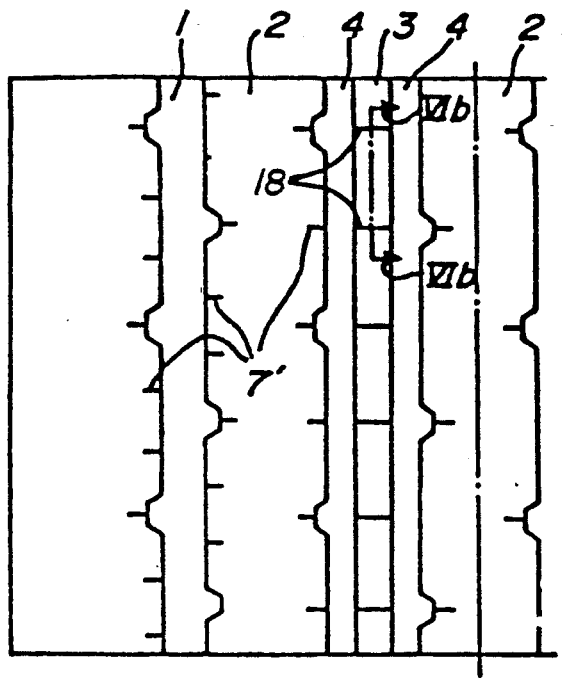
FIG_6b
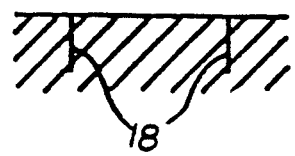
FIG_6c
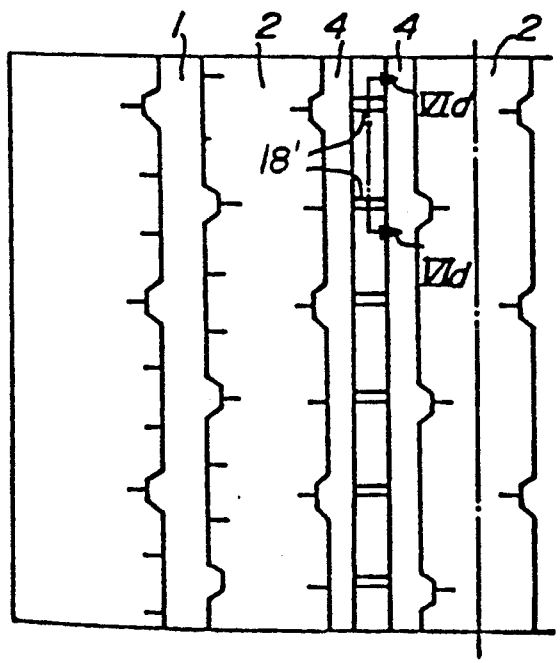
FIG_6d
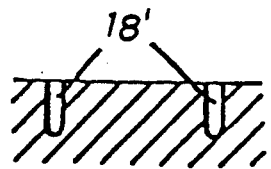

FIG_7a
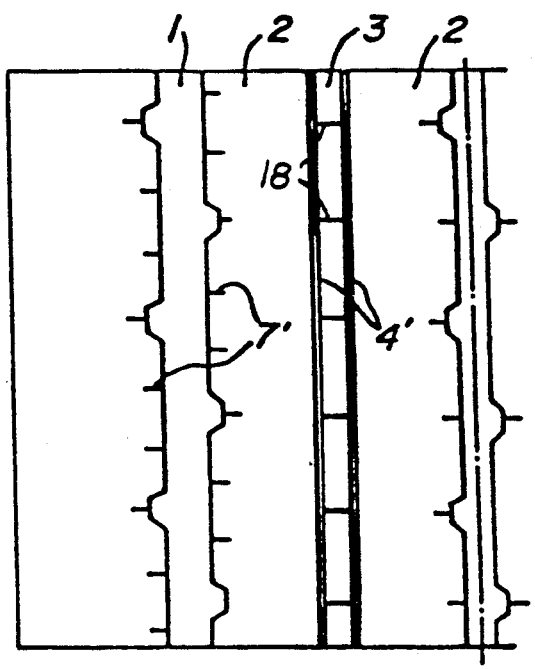
FIG_7b
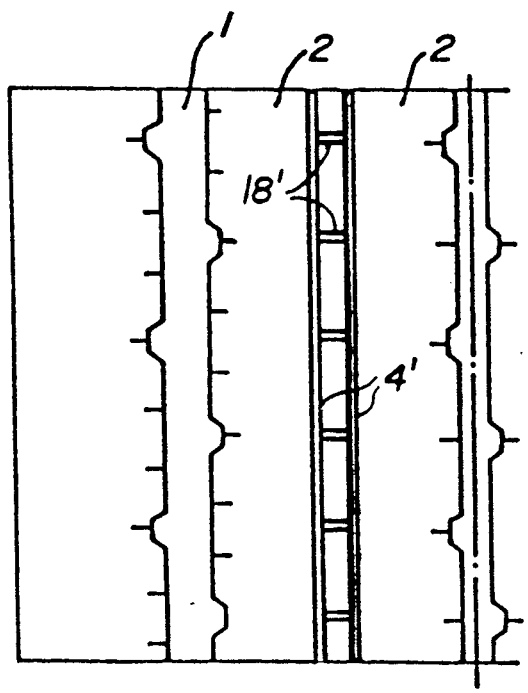

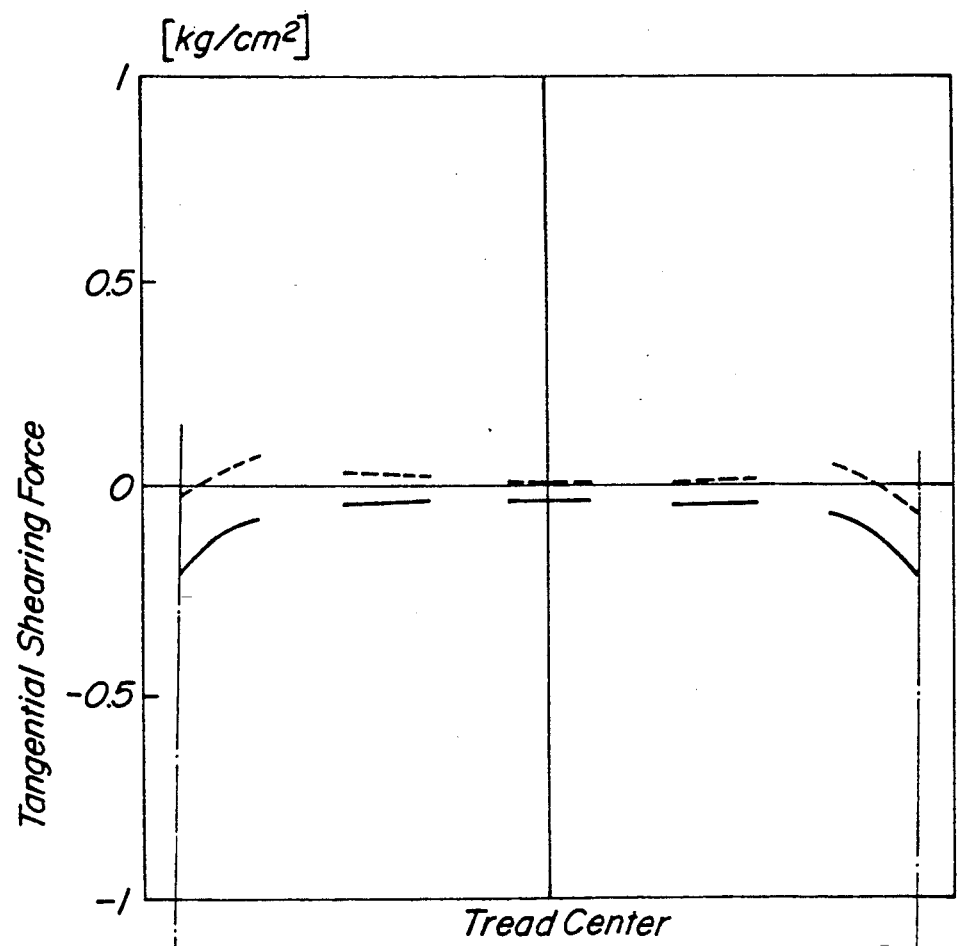
FIG._8a
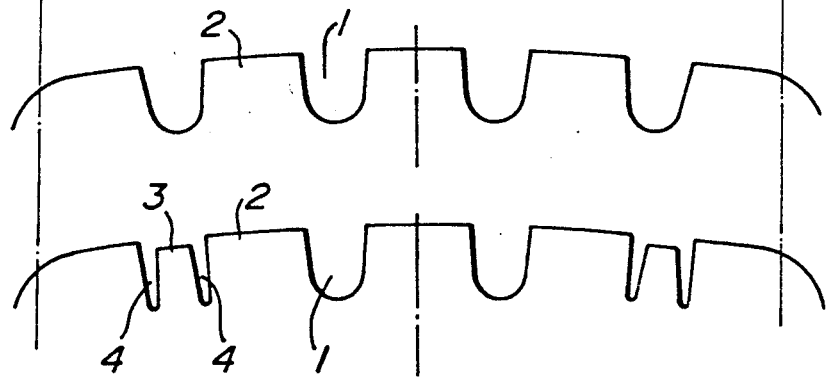
FIG.8b
FIG.8c

FIG_9a
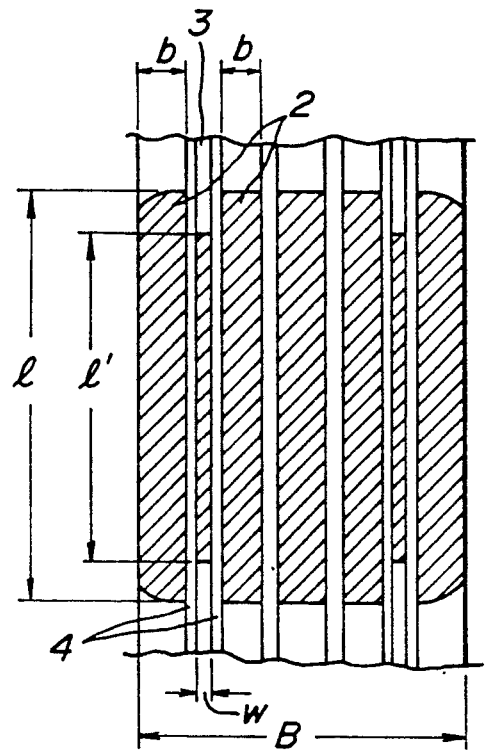
FIG_9b
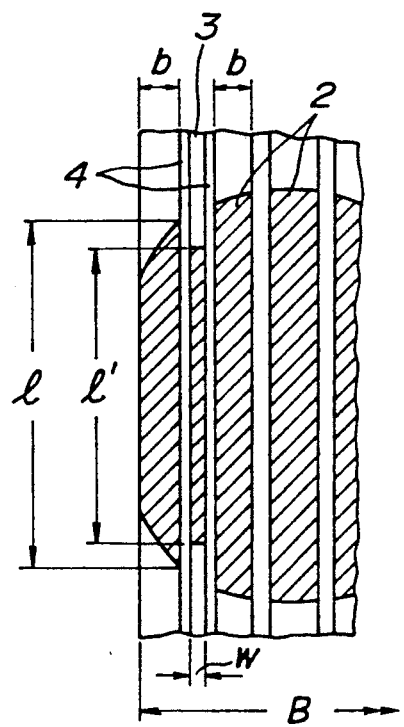

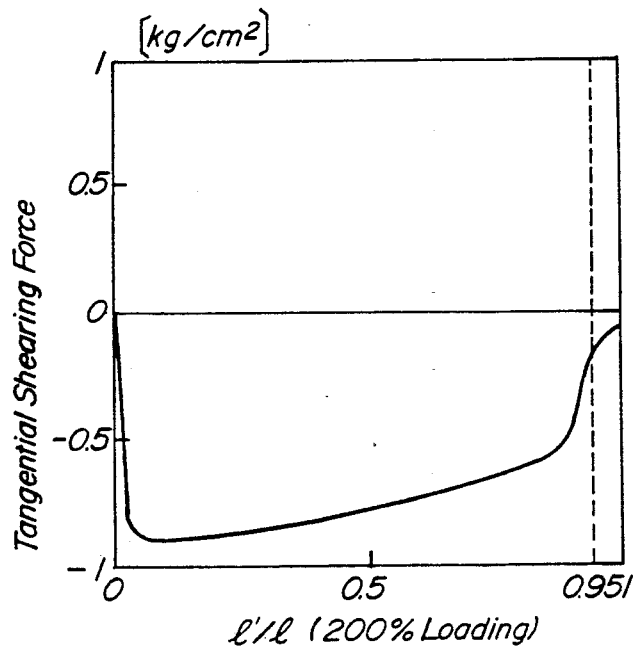
FIG_10a
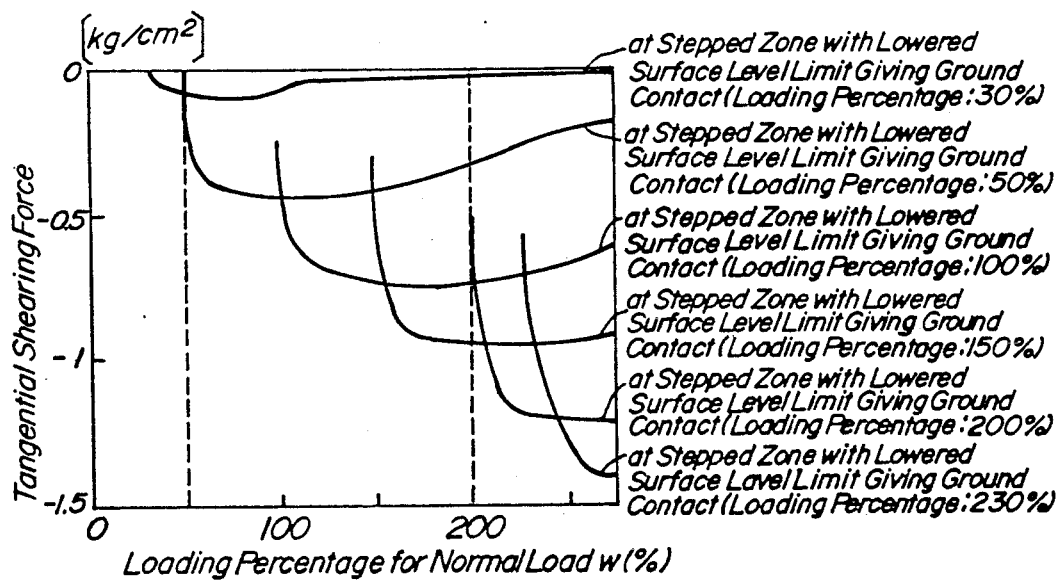
FIG_10b

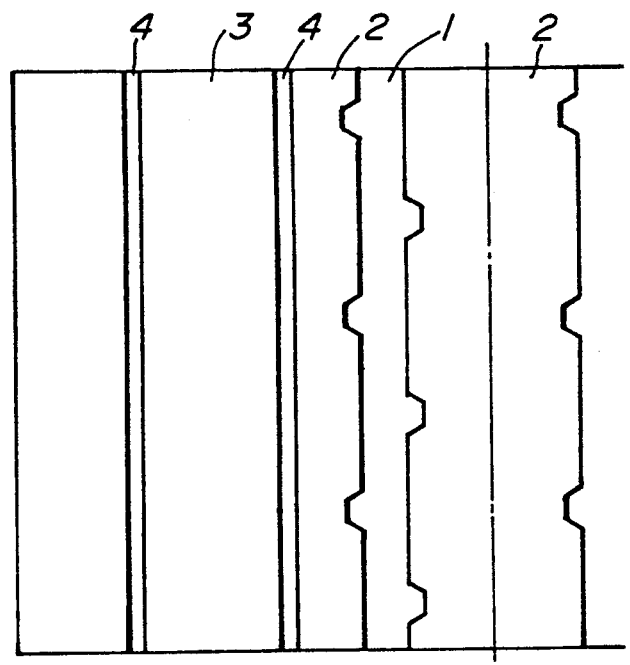
FIG_11a
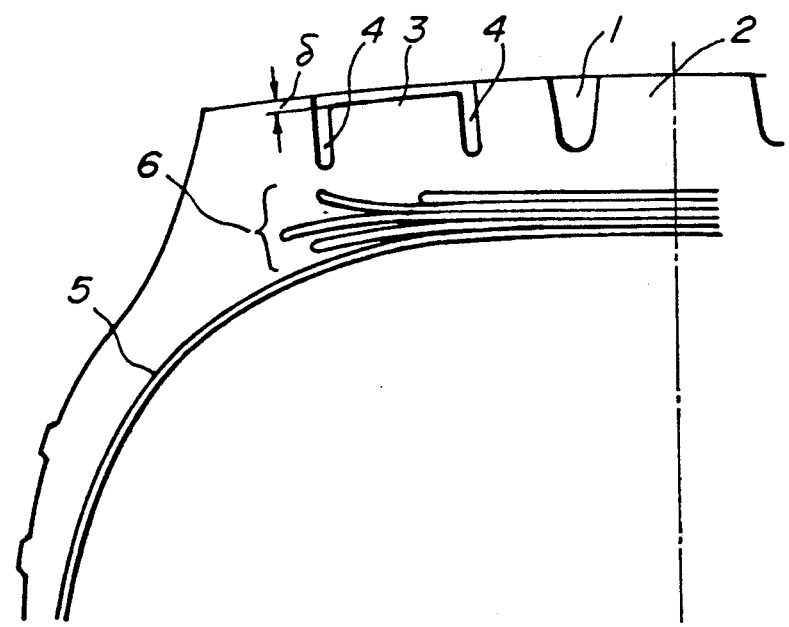
FIG_11b

FIG._12a  PRIOR ART
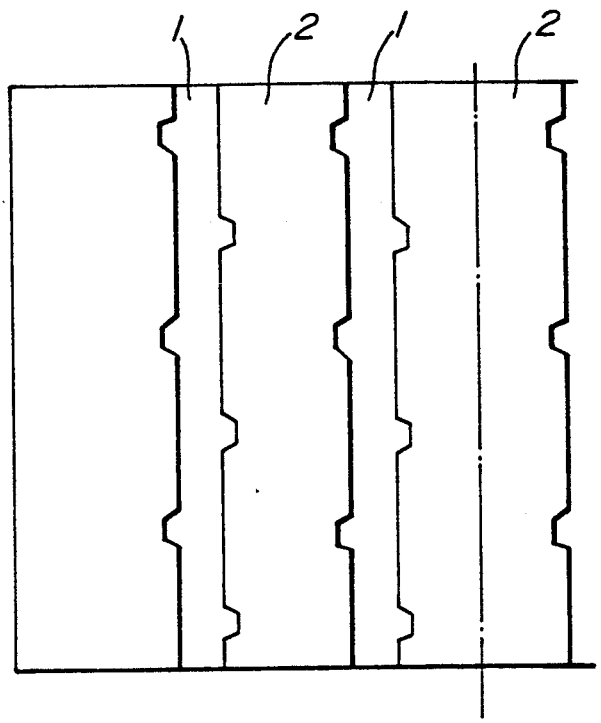
FIG._12b
PRIOR ART
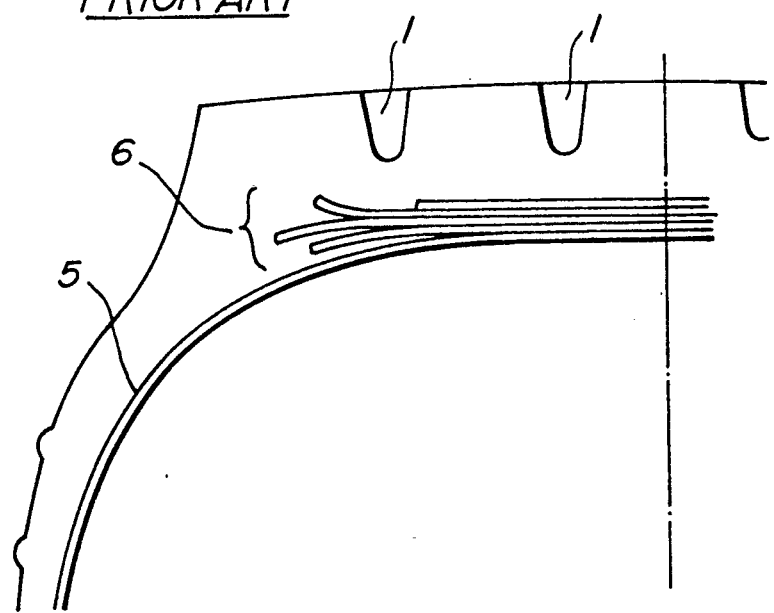

FIG_13
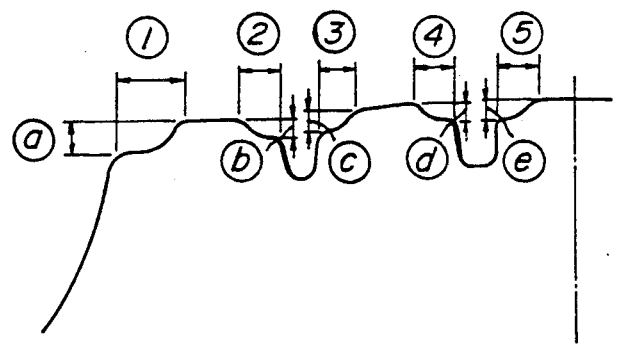
FIG_14a
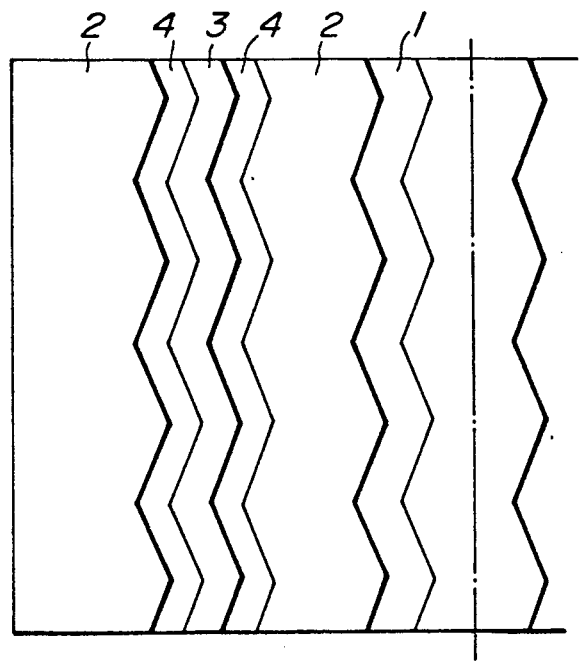
FIG_14b
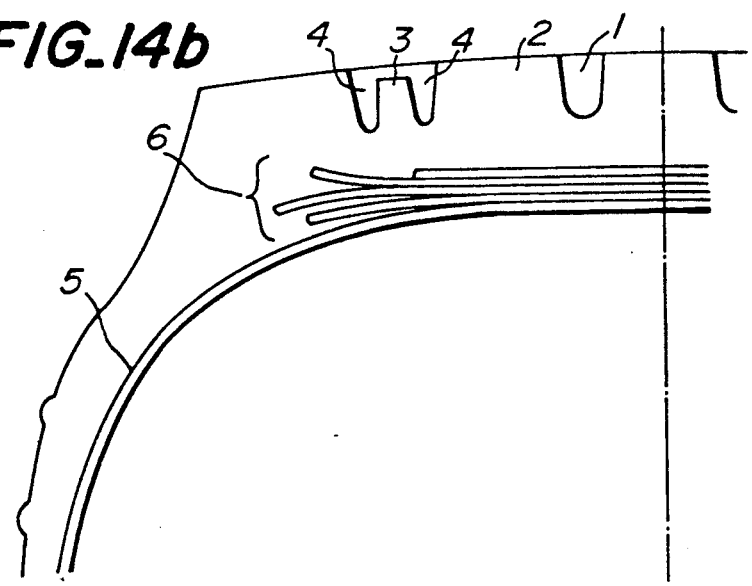

FIG._15a
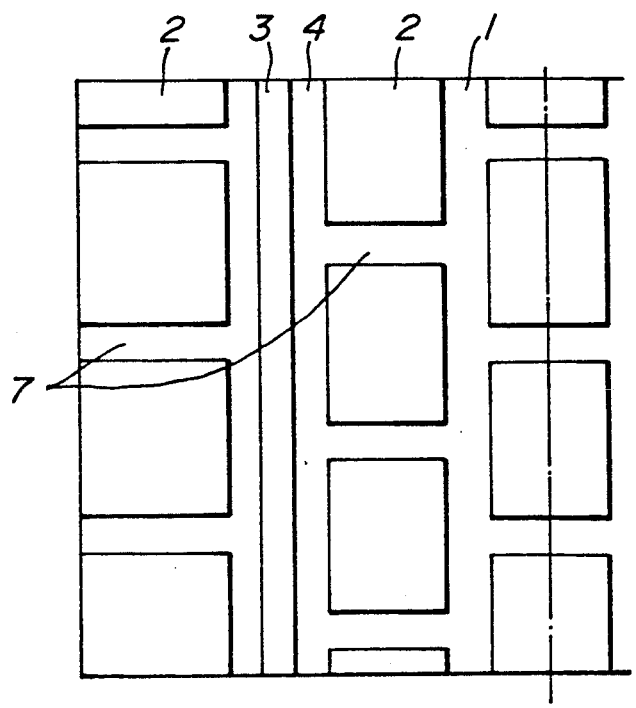
FIG._15b
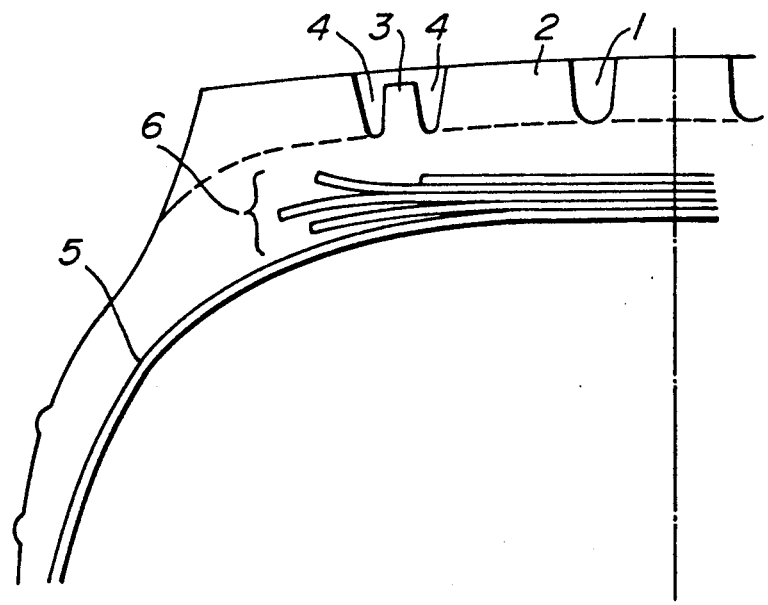

FIG_16a
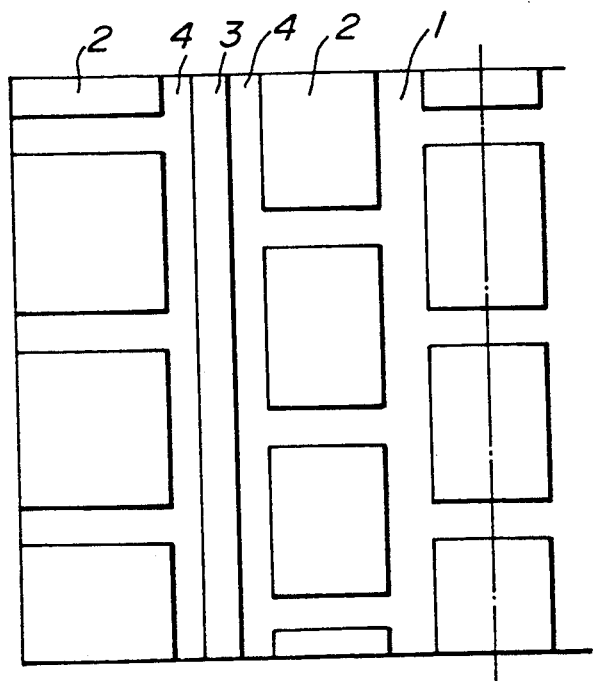
FIG_16b
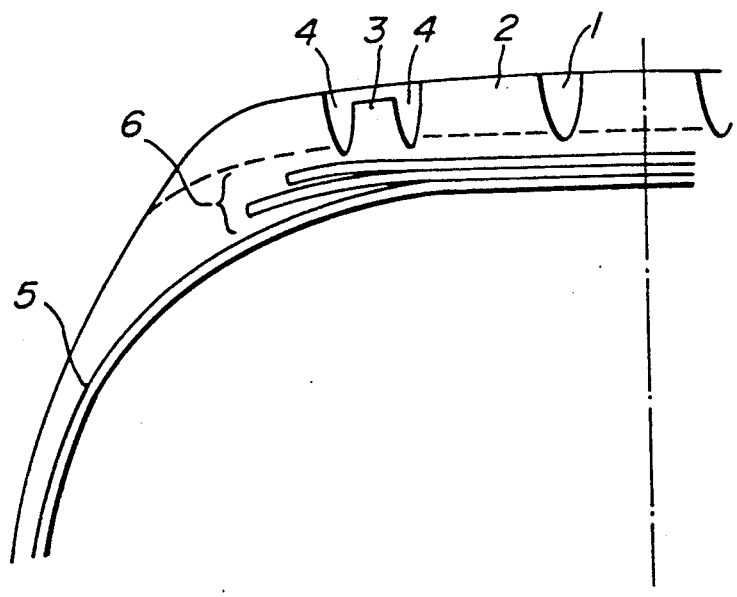

FIG_17a
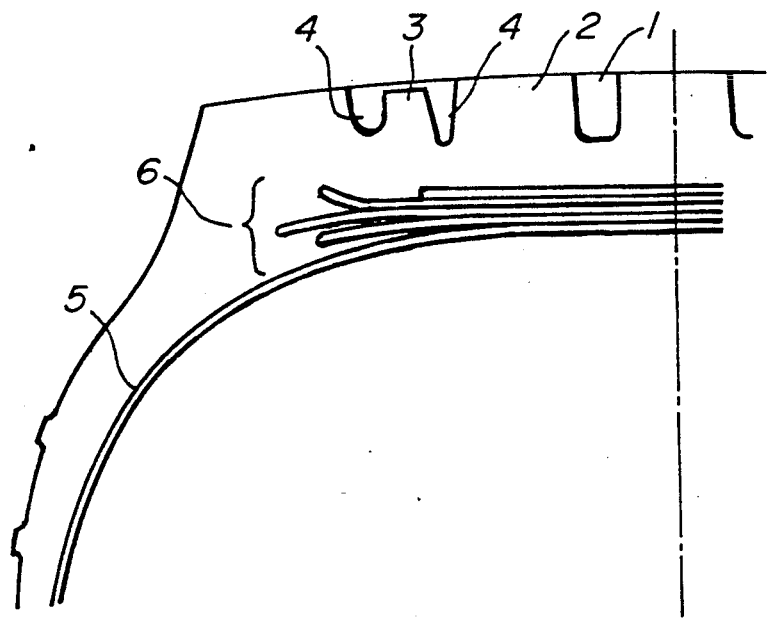
FIG_17b
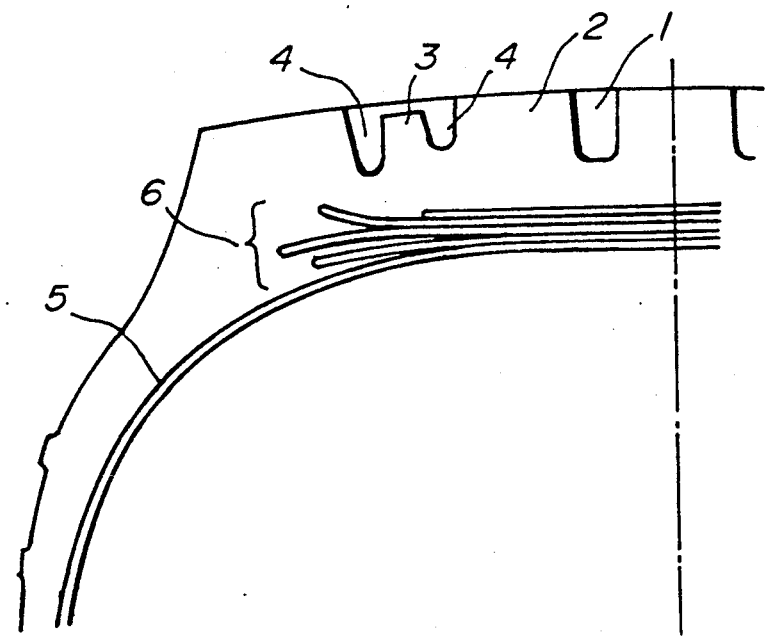

FIG_19a
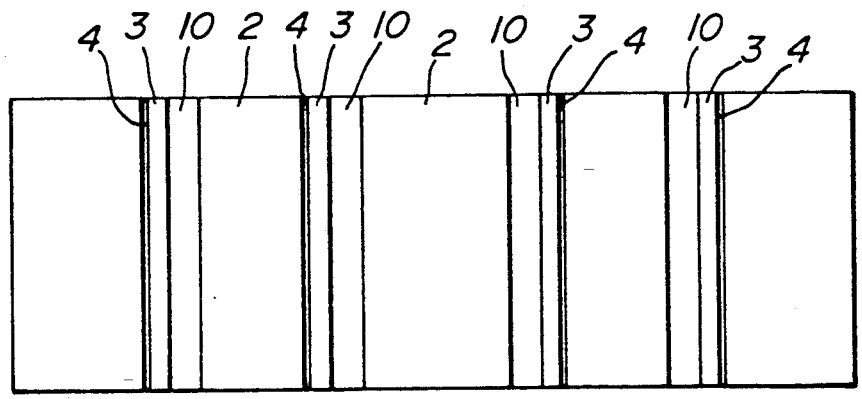
FIG_19b
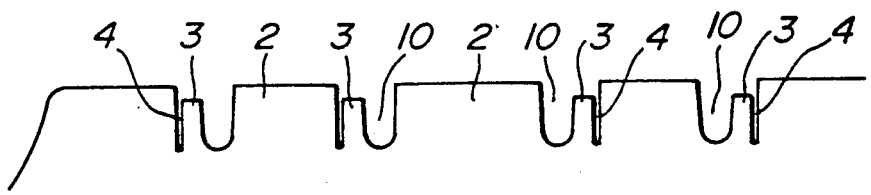
FIG_20a
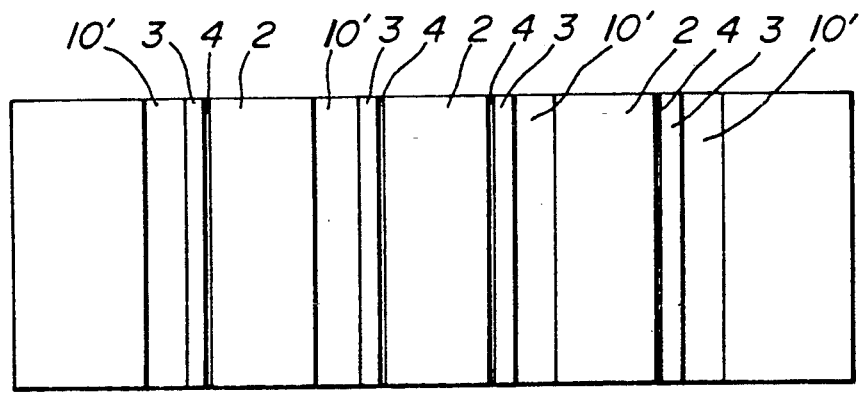
FIG_20b
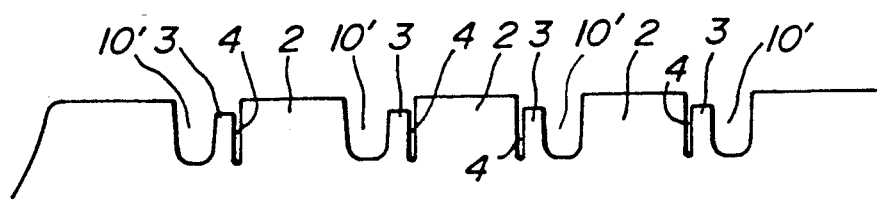

FIG_21
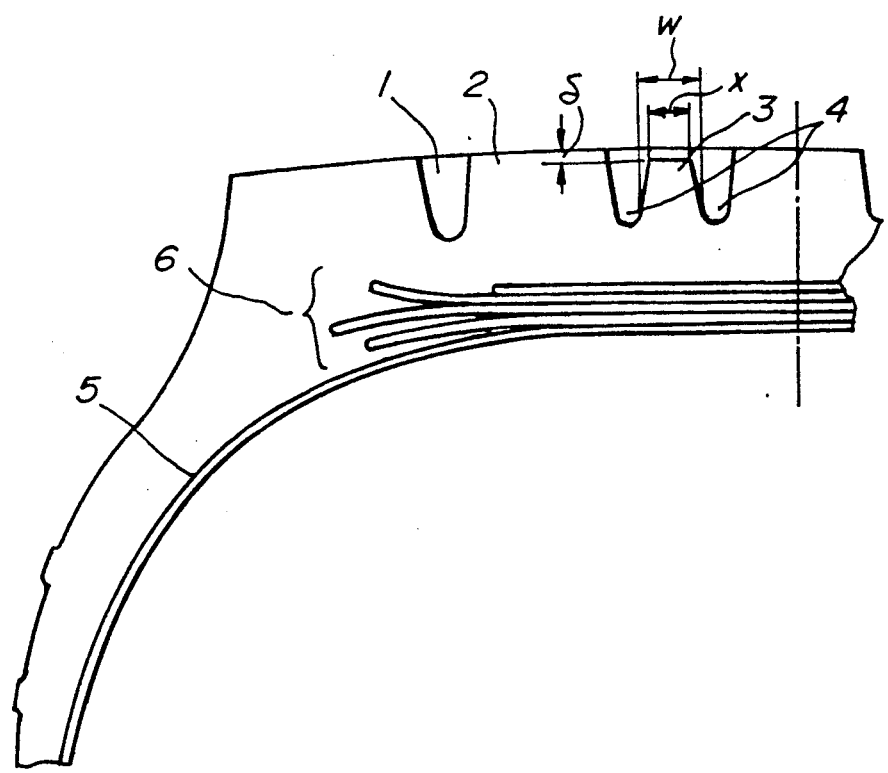

FIG_22a
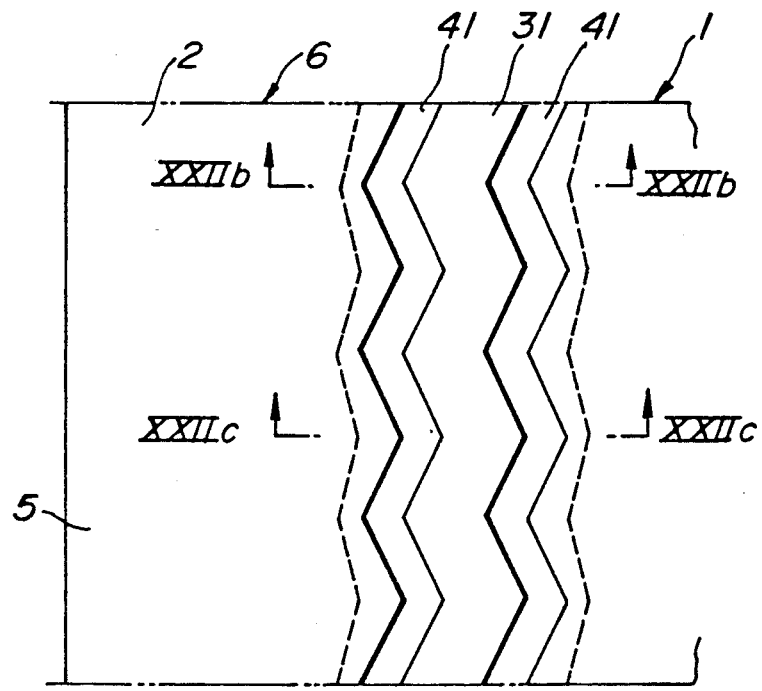
FIG_22b
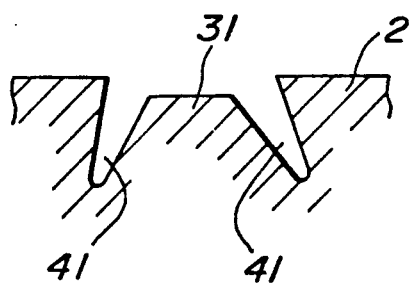
FIG_22c
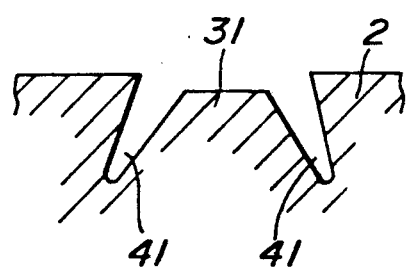

FIG_23a
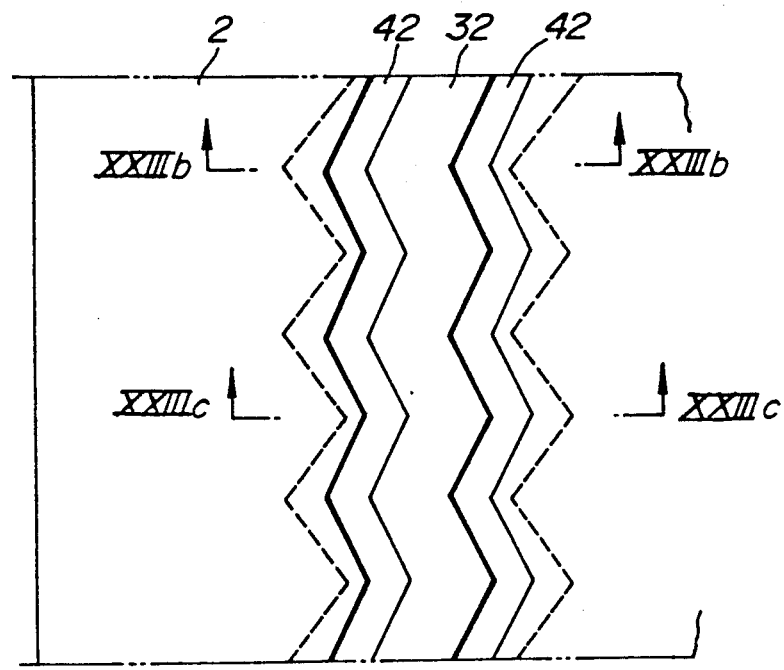
FIG_23b
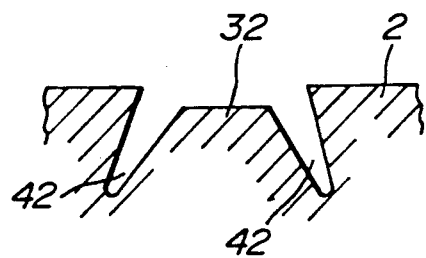
FIG_23c
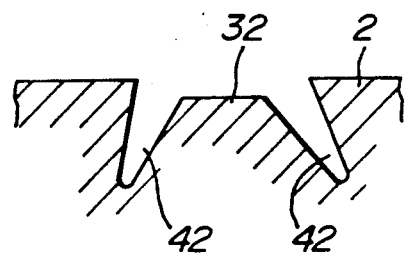

HEAVY DUTY PNEUMATIC TIRES INCLUDING STEPPED TREAD ZONES FOR PREVENTING UNEVEN WEARING

BACKGROUND OF THE INVENTION (1) Field of the Invention:

The present invention relates to heavy duty pneumatic tires having excellent uneven wear resistance.

(2) Related Art Statement:

Recently, the radial carcass structure has come to mainly be employed in the case of heavy duty pneumatic tires. When tires of this structure are used in heavy vehicles such as trucks or buses particularly in free rolling wheels or in driven wheels, so-called uneven wearing often occurs far before the tires do not reach a complete wear life span, thereby causing poor appearance. Further, it is feared that when the tires are continuously used as they are, such a use leads to breakage of land portions called rib punches, thereby causing problems in tire performance.

In order to reduce uneven wear of treads, there have been many proposals on crown contour configurations and tread patterns, particularly on sipe arrangements. However, appropriate countermeasures for preventing uneven wearing have not yet been established.

For reference, as typical known literature, for example, there are available U.S. Pat. No. 4,155,392 in which the crown contour configuration is varied, and U.S. Pat. No. 3,550,665 in which sipes are provided on opposite side portions of each of ribs.

Further, as in the case of U.S. Pat. No. 4,200,134, in order to prevent uneven wearing around grooves, a countermeasure is proposed to prevent stress concentration upon projections of land portions arranged corresponding to a zigzag groove by means of a stress-mitigating rib having the same surface level as that of the land portions of the tread while being spaced from the land portions via the groove. However, in such a countermeasure, the stress-mitigating rib itself tends to peel off. Thus, even if the occurrence of uneven wearing can be retarded, it cannot ultimately be prevented.

The above uneven wearing phenomenon occurring in the tires of this type as a matter of course depends upon running conditions, road surface conditions, etc. When tires are run on recently greatly consolidated highway roads exclusively for automobiles over an extended period of time, the speed of wearing which changes the contour configuration of the tire varies depending upon external forces (forces inputted to the tire) exerted from the tread in the ground-contacting area of the tire. Under the circumstances, wearing is acceleratingly accumulated and promoted in the area at which the wearing is faster.

To the contrary, there are conventional techniques for increasing a ground-contact pressure at a portion at which uneven wearing is more likely to occur or techniques for reducing shearing forces (by notches or the like) so as to control or retard acceleratingly promoted wearing. In such techniques, even if accelerated uneven wearing can be retarded, wearing cannot be prevented from appearing soon. Further, it was often observed that load sharing of the tire varies owing to the wearing, and that uneven wearing occurs.

SUMMARY OF THE INVENTION

The present invention is to propose heavy duty pneumatic tires in which simple and appropriate countermeasures are taken against uneven wearing through fundamentally solving uneven wearing behavior in such tires.

More particularly, the present invention is based on knowledge obtained by detailed experiments and examinations of movements and directions of forces inputted to tires, and is to establish countermeasures for effectively preventing uneven wearing by locally shutting uneven wearing inevitably occurring on the tread of the tire without adversely influencing tire performance.

According to the present invention, there is a provision of a heavy duty pneumatic tire preventing uneven wearing, comprising main grooves continuously extending in a tread of the tire along a circumference thereof, land portions separated by the main grooves, and stepped zones each having a surface located radially inside of a contour line of the tread by a step as viewed sectionally, each of said stepped zones being separated from the adjacent land portions via a pair of circumferentially extending grooves or narrow cuts, whereby an uneven wear-sacrificed portion is formed by a surface of each of the stepped zones, said uneven wearing-sacrificing portion slide-contacting with the tread within the tread ground-contacting area for supporting the load exerted upon the tire.

By so constructing, uneven wearing of the tire can easily and appropriately be prevented during the entire use life due to the action of the uneven wearing-sacrificing portions locally provided on the tread without particularly influencing the tire performances.

These and other objects, features, and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1(a) and (b) are a developed view and a sectional view of a left half principal portion of a heavy duty pneumatic tire embodying the present invention, respectively;

FIG. 2 is a developed view of a left half principal portion of another heavy duty pneumatic tire according to the present invention;

FIGS. 3(a) and (b) are a developed view and a sectional view of a left half principal portion of a modification of FIG. 2 according to the present invention, respectively;

FIGS. 4(a) and (b) are a developed view and a sectional view of a left half principal portion of still another embodiment according to the present invention;

FIGS. 5(a) and (b) are a developed view and a sectional view of a left half principal portion of a further embodiment according to the present invention, respectively;

FIGS. 6 and 7 show still further embodiments according to the present invention;

FIGS. 8 and 9 are schematic views illustrating tires according to the present invention;

Figure 1A:
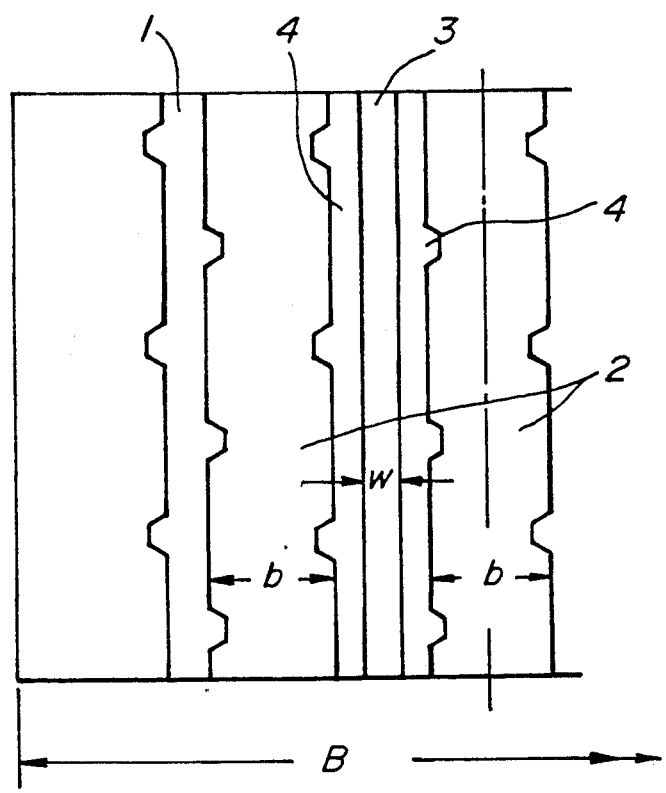

FIGS. 10(a) and (b) are diagrams showing the relationship between l'/l and the tangential shearing forces and the relationship between the load ratio per the normal load W and the tangential shearing forces, respectively;

FIGS. 11(a) and (b) are a developed view and a sectional view of a left half principal portion of a further embodiment according to the present invention, respectively;

FIGS. 12(a) and (b) are a developed view and a sectional view of a left half principal portion of a prior art tire;

FIG. 13 illustrates a worn state of a tire tested; and

FIGS. 14 through 24 show still further embodiments according to the present invention.

DETAILED DESCRIPTION OF THE INVENTION

In the present invention, the tread pattern includes the main grooves continuously extending circumferentially along the tread as well as circumferential grooves and/or narrow cuts, and is not limited to tires in which the pattern is in parallel with the tire equator, so called circumferentially straightly extending grooves. The tread pattern may include well known zigzag grooves. Further, it will be appreciated that the land portions separated by the above main grooves include ribs, blocks divided by lateral grooves and/or auxiliary grooves, and rib-block composite patterns including such ribs and blocks.

The invention will be explained in more detail with reference to the attached drawings. In the drawings, same or similar reference numerals and characters denote same or similar parts.

In FIGS. 1(a) and (b) are shown a developed view and a sectional view of a left half principal portion of a tread of a heavy duty pneumatic tire according to the present invention. Reference numerals 1, 2 and 3 are a main groove, a land portion, and a stepped zone, respectively. Reference numerals 4, 5, and 6 are a narrow groove, a radial carcass, and a belt, respectively. Characters "b", "w", and "δ" denote the width of the stepped zone, the greatest width of the land portion, and an axial surface level difference between the stepped portion and the tread surface, respectively.

FIG. 2 is a developed view of another embodiment according to the present invention, in which rows of cuts 7 are provided in edges of each of land portions 2 facing main grooves and narrow grooves to reduce shearing forces occurring at groove edges.

FIGS. 3(a) and (b) illustrate a further embodiment according to the present invention, in which the number of cuts 7' is reduced as compared with that of the cuts 7 in FIG. 2, and a scooped portion 8 is formed at each of buttress of the tire to reduce uneven wearing due to lateral forces exerted upon the tire.

Although FIGS. 1 through 3 illustrate the tires in which the land is divided into a center rib and an intermediate rib by the narrow grooves 4 which define the stepped zone 3, FIGS. 4(a) and (b) illustrate an embodiment in which a land portion is divided into a side rib and an intermediate rib.

Figure 5A:
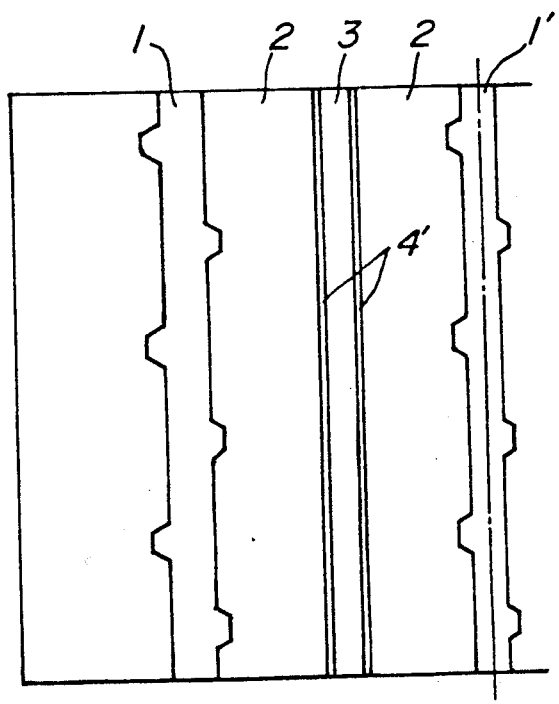

FIGS. 5(a) and (b) illustrate an embodiment having a center main groove 1'. Instead of the narrow grooves 4 in FIG. 1, a stepped zone 3 is spaced from the land portions 2 by sipes 4' (narrow cuts).

FIGS. 6(a) and (c) are developed views of still further embodiments according to the present invention, and FIGS. 6(b) and (d) are sectional views of FIGS. 6(a) and (c) along lines VIb—VIb and VId—VId, respectively. In FIGS. 6(a) and (b), the stepped zone 3 in FIGS. 3(a) and (b) are divided by lateral sipes 18 in the tire circumferential direction. In FIGS. 6(c) and (d), the stepped zone 3 of FIGS. 3(a) and (b) is similarly divided by lateral grooves 18. Thereby, shearing forces at the stepped zone 3 itself are reduced.

In FIGS. 7(a) and (b) are shown developed views of a tire of FIG. 5 to which the countermeasure in FIGS. 6(a) and (b) or that in FIGS. 6(c) and (d) is applied, respectively.

Next, functions of the above-mentioned embodiments according to the present invention will be explained.

In general, when a tire rotates under application of a load, a tread is sheared in a tangential direction so that a shearing force occurs on the tread in the tangential direction. FIG. 8(a) shows the distribution of shearing forces at land portions 2 of the tread in the tire axial direction. Solid lines denote the distribution of shearing forces in a conventional tire sectionally shown in FIG. 8(b). Broken lines denote the distribution of shearing forces in the case of a tire according to the present invention in FIG. 8(c) provided with stepped zones 3A lowered surface level "δ" of each of the stepped zones is set at 2 mm. In FIG. 8(a), shearing forces on a driving side and on a braking side are given on positive and negative zones of the ordinate, respectively.

It was experimentally confirmed that uneven wearing mainly occurs on the negative shearing force zone of the tire, and that uneven wearing is likely to occur from a location of the tire at which the shearing force in the tangential direction is greater on the negative zone within the tread surface.

As is clearly seen from comparison in the distribution of the shearing forces between the solid lines and the broken lines in FIG. 8(a), the shearing forces on the land portions of the tire according to the present invention having the stepped zones shift toward the positive zone than those in the conventional tire.

That is, it is made clear that the stepped zones 3 serve as uneven wear-sacrificed portions for undergoing uneven wear which should have occurred on the land portions 2 of the tread.

In order to exhibit the above effect, the stepped zones 3 must contact with the ground so that uneven wear may not occur on the land portions 2. Further, the stepped zones must be radially stepped down by such a level that sufficient negative shearing forces may occur to make the stepped zones serve as the uneven wear-sacrificed portions.

Therefore, it is indispensable that the surfaces of the stepped zones contact with the ground within a ground-contacting area of the tread to support a load applied to the tire.

In order to effectively produce negative shearing forces at the stepped zones 3, it is preferable to set the ratio of l'/l [see foot prints of the tire treads in FIGS. 9(a) and (b)] at less than 0.95 in which l and l' are the shorter one of circumferential ground contact lengths of the land potions 2 adjacent to the stepped zone 3, and the ground contact length of the stepped zone 3, respectively, when 200% of a normal load is applied to the tire. If the ratio of l'/l is less than 0.95, as shown in FIG. 10(a), the shearing forces occurring on the stepped zone 3 in the tangential direction rapidly increases in the negative direction, and the effect of the ratio of l'/l affecting uneven wear-sacrificed function at the stepped zone 3 increases as the ratio of l'/l becomes smaller.

Figure 1B:
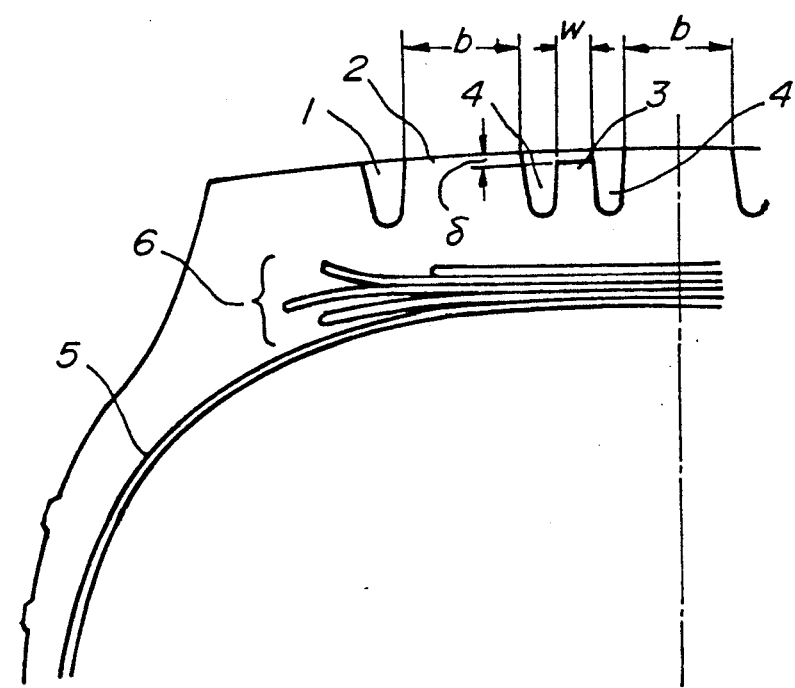
Figure 5B:
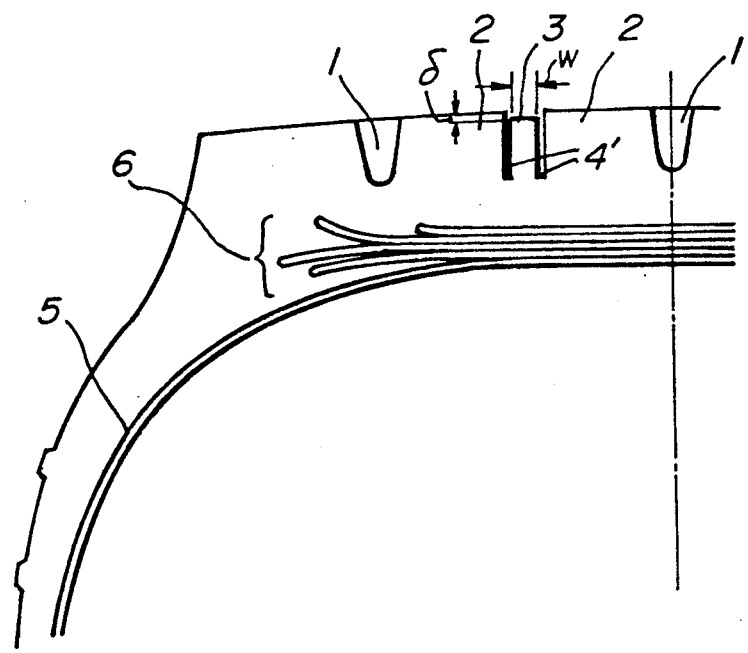

Further, the lowered surface level "δ" of the stepped zone 3 [see FIG. 1(b), and FIG. 5(b)] is preferably set at such a value that the stepped zone 3 may contact the ground under application of 50% to 200% of the maximum load to the tire. [The maximum loads are specified for tires of various kinds. For example, see TRA (Tire and Rim Association, "Tire load limit", JATMA (Japan Automobile Tire Manufacturer Association), "Tire Maximum Loads" etc.]

FIG. 10(b) shows tangential shearing forces at the stepped zone having a lowered surface level limit under each of specified loading percentages. The lowered surface level limit is to bring the stepped zone into contact with the ground under the specified loading percentage. As is clear from FIG. 10(b), if the lowered surface level is so small that the stepped zones contact the ground under application of less than 50% of the maximum load, sufficient negative shearing forces cannot be obtained, while if the lowered surface level is so great that the stepped zones begin to contact the ground under application of more than 200% of the maximum load, the stepped zone will not contact the ground during practical use of the tire so that effective shearing forces cannot be obtained. In FIG. 10(b) are plotted tangential shearing forces via loading percentages with respect to a tire having a tread with a tread gauge h=20 mm and elasticity E of a tread rubber being 53 kg/cm². An actual tread contact area S of the tire was varied among $S_{0.3}$:143 cm², $S_{0.5}$:191 cm², $S_{1.0}$:318 cm², $S_{1.5}$:398 cm², $S_{2.0}$:445 cm², and $S_{2.3}$:461 cm² by variously changing the loading percentage of the normal load W (2,700 kg) upon the tread. The suffix to S denotes the loading times of the maximum load.

According to FIG. 10 (b), lower and upper limits of the lowered surface level "δ" with respect to the sectional contour line of the tread are determined by the following formulae, respectively.

$$\text{Lower limit} = \frac{0.5 \cdot W'}{S_{0.5}} \cdot \frac{h}{E}, \text{ upper limit} = \frac{2W'}{S_{2.0}} \cdot \frac{h}{E}$$

In order to sufficiently produce the negative shearing forces at the stepped zones, the land portions 2 must not hinder the tangential shearing of the stepped zones 3. It is desired that the stepped zones will not contact the land portions when the former are sheared.

Next, if the total width of the stepped zones 3 in the tire axial direction is less than 5% of the ground contacting width of the tread, no sufficient effect cannot be obtained, while if it is more than 25% of the tread ground contacting width, wear resistance is conspicuously lowered to the contrary. Thus, the total width of the stepped zones is preferably in a range from 5 to 25% of the tread ground contacting width.

If the actual ground contacting area of the entire stepped zones 3 exceeds 20% of that of the whole land portion,, wear resistance is conspicuously lowered. Thus, the actual ground contacting area of the whole stepped zones 3 is preferably not more than 20% of that of the whole land portions.

Furthermore, in order to effectively produce the negative shearing forces at the stepped zones 3, the deformation of the stepped zones must be not flexural deformation, but shearing. For this purpose, it is necessary to increase the rigidity of the stepped zones in the rotating direction. Since there is the limitation that if the stepped zone is made wider, wear resistance lowers, it is necessary that the rigidity of the stepped zone is made greater in the tangential direction by making the ground contact length l' larger than the axial width "w" of the stepped zone 3. Sufficient effects can be obtained when the axial width "w" of the stepped zone 3 is not more than ½ of the axial width "b" of the land portion 2 adjacent thereto on each of the opposite sides thereof.

Next, specific examples are given in illustration of the present invention below.

EXAMPLES 1-5

First, Reference Examples 1 and 2 which were the same as the tires illustrated in FIGS. 12 and 1, respectively, except for the following were prepared. In Reference Example 1, no anti-wearing countermeasure was taken, while in Reference Example 2, the lowered surface level of the stepped zones was set at zero. On the other hand, tires each having a tread pattern shown in FIG. 1, 2, 3 or 4 with a lowered surface level "δ" and a width "W" specified in the following Table 1 were separately prepared. All the tires had a tire size of 10.00 R 20. With respect to the above tires, the width and depth of uneven wearing were compared, and results are shown in Table 1.

In tests, each of the tires was fitted to a front wheel of a 2 wheel-driven type 4 wheel vehicle, and run completely over a running distance of 80,000 km. Comparison was made by taking the total width of broken portions occurring at edges of land portions at 1 through 5 of a left half portion of the tire as shown in FIG. 13 as an uneven worn width, while the average depth of the broken portions at the portions 1 through 5 being taken as the depth of the uneven wear.

TABLE 1

|  |  | Example 1 | Example 2 | Example 3 | Example 4 | Example 5 | Reference Example 1 | Reference Example 2 |
|---|---|---|---|---|---|---|---|---|
| Figure (pattern) | | FIG. 1 | FIG. 1 | FIG. 2 | FIG. 3 | FIG. 4 | FIG. 12 | FIG. 1 |
| Stepped depth δ (mm) | | 2 | 2 | 2 | 2 | 2 | — | 0 |
| Width W (mm) | | 10 | 5 | 10 | 10 | 10 | — | 10 |
| Test results | Uneven worn width (mm) | 17 | 42 | 12 | 3 | 15 | 85 | 78 |
| | Uneven worn depth (mm) | 1.5 | 3.2 | 0.5 | 0.3 | 1.2 | 4.5 | 3.8 |

EXAMPLES 6-9

Test tires each having a tire size of 10.00 R 20 and a tread pattern shown in FIG. 11, 11 or 12 were prepared. In Reference Example 3, the lowered surface level "δ" was set at 0 mm, and in Reference Example 4, no anti-wearing countermeasure was taken as shown in FIGS. 12 (a) and (b). Various dimensions of these tires are given in the following Table 2.

TABLE 2

|  | Example 6 | Example 7 | Example 8 | Example 9 | Reference example 3 | Reference example 4 |
| --- | --- | --- | --- | --- | --- | --- |
| Figure (pattern) | FIG. 4 | FIG. 4 | FIG. 4 | FIG. 11 | FIG. 4 | FIG. 12 |
| l/l' | 0.75 | 0.25 | 0 | 0.75 | 1 | — |
| δ (mm) | 2 | 4 | 6 | 2 | 0 | — |
| DW/TW | 0.09 | 0.09 | 0.09 | 0.30 | 0.09 | — |
| DS/TS | 0.09 | 0.03 | 0 | 0.62 | 0.12 | — |

DW: Total width of stepped zones
TW: Tread ground contact width
DS: Actual ground contact area of stepped zones
TS: Actual ground contact area of land zones

TABLE 3

|  | Example 6 | Example 7 | Example 8 | Example 9 | Reference example 3 | Reference example 4 |
| --- | --- | --- | --- | --- | --- | --- |
| Uneven worn width (mm) | 20 | 16 | 46 | 8 | 76 | 86 |
| Uneven worn depth (mm) | 2.4 | 2 | 5.6 | 1 | 4.1 | 4.8 |
| Wearing index* | 99 | 98 | 96 | 53 | 96 | 100 |

Note:
*The greater the figure, the higher the wear resistance.

Each of the tires was fitted to a front wheel of a 2-wheel driven type 4 wheel vehicle, and run completely over a running distance of 80,000 km under application of a normal load.

After running over 80,000 km, with respect to each tire, the magnitude of uneven wearing at the land portions 1 through 5 was measured in the manner shown in FIG. 13, and comparisons were made with respect to the total width and the average depth of the uneven worn portions. Evaluation results are shown in Table 3.

As is clear from the results in Table 3, uneven wear-sacrificed portions according to the present invention function to conspicuously reduce or effectively prevent uneven wearing accumulating during an almost entire wearing life of the tire.

Similar tests were carried out with respect to a tire having zigzag main grooves 1 as shown in FIGS. 14(a) and (b), a tire having lateral grooves 7 added as shown in FIGS. 15(a) and (b), a tire having shoulders rounded as shown in FIGS. 16(a) and (b), and a tire shown in FIGS. 17(a) and (b) in which depths of narrow grooves 4 sandwiching a stepped zone 3 are varied. Consequently, results similar to those of the tire shown in FIG. 1 were obtained.

Figure 18A:
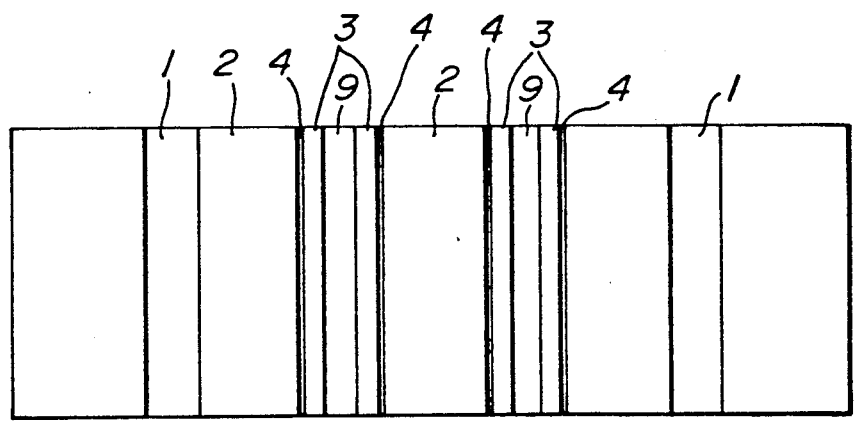
Figure 18B:
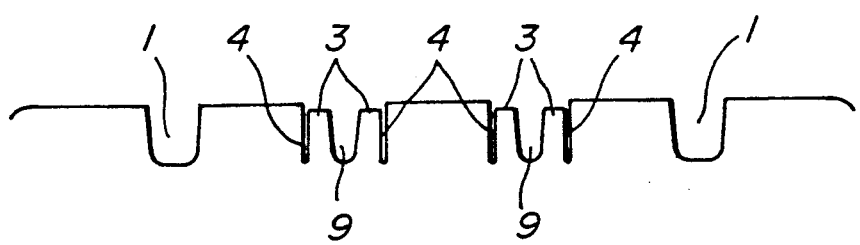

In addition to a platform shape occupying inside a wide main groove as illustrated in the above explanation and the attached drawings, the stepped zone 3 may be a composite type combining narrow grooves 4 and sipes or narrow cuts 4', such as a middle depressed type 9 shown in FIGS. 18(a) and (b), a one side depressed type 10 or 10' as shown in FIGS. 19(a) and (b) and FIGS. 20(a) and (b), respectively.

Further, wearing is more conspicuously accumulated and promoted in pneumatic tires in a stage from a wearing middle period to a wearing latter period after running over a long distance as compared with a wearing initial stage. Therefore, if the axial width of the stepped zone is constant in a tire radial direction, wearing of land portions in the stage from wearing middle period to the wearing latter period exceeds wear-preventing ability of the stepped zones. In some cases, uneven wear of the land portions cannot assuredly be prevented.

Thus, it is preferable that while the radially outer face of each of the stepped zones is located radially inside the sectional contour line of the tread, the axial width of the radially inner side of each of the stepped zones is greater than that of the radially outer side thereof.

For instance, as shown in FIG. 21, the axial width "w" of the radially innermost side of a stepped portion 3 is greater than that "x" of the radially outermost side thereof. The ratio of x/w is preferably in a range from 1.2 to 5.0. The reason is that if the ratio is less than 1.2, the stepped zone 3 cannot sufficiently prevent uneven wear of the land portions for the wear latter period during wearing of the stepped zone 3. On the other hand, if the ratio of x/w is more than 5.0, the axial width "x" of the radially outermost side of the stepped zone is so small that uneven wearing cannot be prevented even in the initial wear stage or that the ground contact area of the entire tread during the initial running stage is so small that wear resistance itself lowers.

FIGS. 22(a), (b) and (c) illustrate a further modification of the present invention. In this embodiment, a pair of circumferential grooves 41 are zigzag bent in a land, and a zigzag bent stepped zone 31 is formed between the circumferential grooves 41. By so construction the tread pattern when the width of the stepped zone 31 is the same, the ground contact area becomes greater than in the case of a stepped zone of a straight rib shape, so that uneven wear can more effectively be reduced. Further, in this embodiment, the circumferential grooves 41 are inclined in the same directions as those of side faces of the stepped zone 31, and the width of the circumferential groove 41 at the deepest portion is made smaller than that at an opening end thereof.

FIGS. 23(a), (b) and (c) show a still further embodiment according to the present invention. The tire in this embodiment is the same as that in FIGS. 22(a), (b) and (c) except that the distance between circumferential grooves 42 is made greater at the deepest portions than that at opening ends thereof.

Figure 24A:
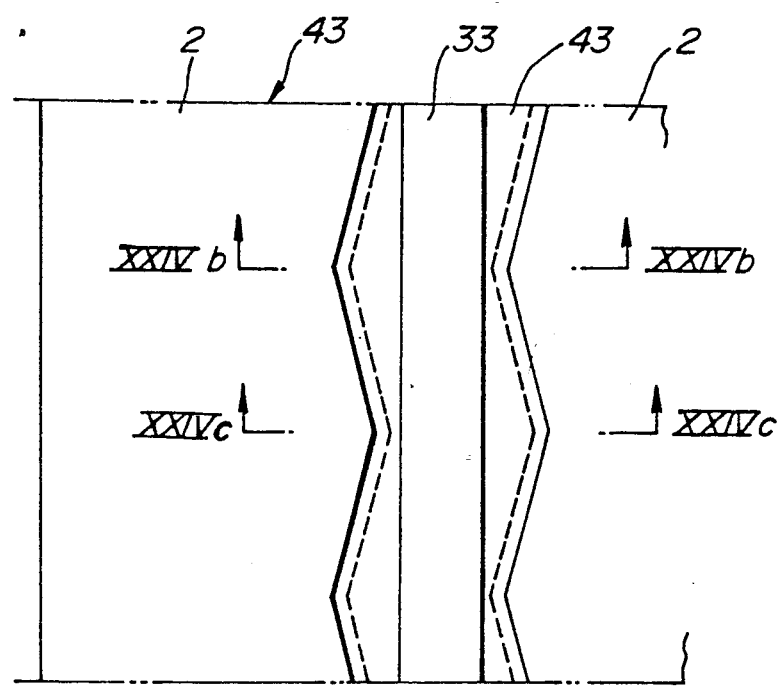
Figure 24B:
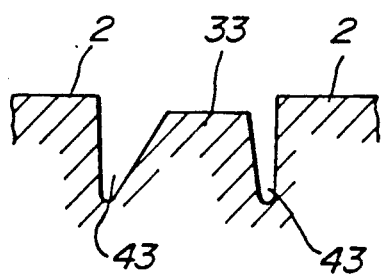
Figure 24C:
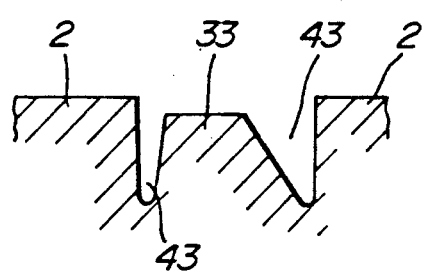

FIGS. 24(a), (b) and (c) illustrate a still further embodiment according to the present invention. In the illustrated embodiment are formed a pair of circumferential grooves 43 in which far spaced side faces of lands are zigzag bent at the same phase, and their adjacent side faces are made linear. A straight stepped zone 33 is formed between these circumferential grooves 43. By so doing, the stepped zone periodically approaches the land portion 2.

As mentioned above, according to the present invention, uneven wear can easily and appropriately be prevented during the entire tire use life by the action of the uneven wear-sacrificed portions locally formed on the tread without affecting any adverse affects upon tire performances.

What is claimed is:

1. A heavy duty pneumatic tire preventing uneven wearing, comprising: main grooves continuously extending in a tread of the tire along a circumference thereof, land portions defined between main grooves or between an outmost main groove and a tire shoulder and separated by the main grooves, and stepped zones, each stepped zone located within a land portion, each stepped zone having a single radially outer top surface located radially inside of a contour line of the tread defined by radially outer surfaces of said land portions as viewed sectionally, each of said stepped zones extending substantially continuously in the tire circumferential direction within a land portion and being separated therefrom by a pair of circumferentially extending narrow grooves or narrow cuts, each of said stepped zones having an axial width "w" which is not more than ½ of a width of each of said adjacent land portions, wherein an uneven wear-sacrificed portion is formed by said radially outer top surface of each of the stepped zones, said uneven wear-sacrificing portion contacting the ground within the tread ground-contacting area for supporting a load exerted upon the tire and said main grooves are devoid of stepped zones.

2. A pneumatic tire according to claim 1, wherein the uneven wear-sacrificed portion is provided in the land portion to meet l'/l<0.95 in which l and l' are a shorter one of circumferential ground contact lengths of ground contact areas of the land portions adjacent to the stepped zone, and respectively, when 200% of a maximum load specified by the tire standard is applied to the tire.

3. A pneumatic tire according to claim 1, wherein a lowered surface level "δ" of the stepped portion with respect to the sectional contour line of the tread falls within a range specified by the following unequality:

$$\frac{0.5 \cdot W'}{S_{0.5}} \cdot \frac{h}{E} \leq \delta \leq \frac{2.0 \cdot W'}{S_{2.0}} \cdot \frac{h}{E}$$

in which:
$S_{0.5}$: an actual ground contact area (cm$^2$) of the tread under application of 50% of a maximum load specified by a tire standard,
$S_{2.0}$: an actual ground contact area of the tread (cm$^2$) under application of 200% of the maximum load,
W: a normal load (kg),
h a tread gauge (cm), and
E a modulus of elasticity of a tread rubber (kg/cm$^2$).

4. A pneumatic tire according to claim 1, wherein the total width "w" of the surface of said stepped zones in a tire axial direction is in the range from 5% to 25% of a ground contact width "B" of the tread.

5. A pneumatic tire according to claim 1, wherein the actual ground contact area of the stepped zones under application of 200% of a maximum load specified by the tire standard is not more than 20% of the actual ground contact area of the tread.

6. A pneumatic tire according to claim 1, wherein each of the stepped zones is divided into a plurality of stepped zone sections by narrow cuts separated in the circumferential direction, adjacent ones of said stepped zone sections contacting together within a ground contact plane under application of a maximum load specified by a tire standard.

7. A pneumatic tire according to claim 1 wherein said land portions have a plurality of sipes on edges thereof extending to a main groove, said sipes separated in the circumferential direction and parallel to each other.

8. A pneumatic tire according to claim 7 further comprising a recess in a shoulder portion of said tire to reduce the gauge of rubber in laterally outward positions of said tread.

9. A pneumatic tire according to claim 1 wherein said land portions have grooves dividing said land portions into a side rib and an intermediate rib and said stepped zones are axially outside said intermediate rib.

10. A pneumatic tire according to claim 6 further comprising circumferentially separated sipes extending laterally in said land portions.

11. A pneumatic tire according to claim 1 further comprising lateral grooves in said land portions extending to said circumferential main grooves.

12. A pneumatic tire according to claim 1 wherein shoulder portions of said tread are tapered into a tire sidewall.

13. A pneumatic tire according to claim 1 wherein said pair of circumferentially extending grooves comprise a narrow groove and a narrow cut extending substantially parallel to each other.

14. A pneumatic tire according to claim 1 wherein a width "w" of a radially innermost side of said surface of said stepped zones is greater than a width "x" of a radially outermost side thereof.

15. A pneumatic tire according to claim 14 wherein a ratio of x/w is in the range of 1.2 to 5.0.

16. A pneumatic tire according to claim 1 wherein said circumferentially extending grooves are zigzag and at least one of such grooves inclined with respect to the circumferential plane of said tire.

17. A pneumatic tire according to claim 16 wherein both of said circumferential grooves are inclined with respect to said circumferential plane of said tire.

18. A pneumatic tire according to claim 1, wherein said stepped zones are divided by lateral grooves to form a series of circumferentially spaced uneven wear sacrificing portions.

19. A pneumatic tire according to claim 1, wherein said stepped zones radially stepped down below said contour line of said tread to a depth sufficient to provide a negative shearing force sufficient for wear of said stepped zones during ground contact.

* * * * *